UNITED STATES PATENT OFFICE.

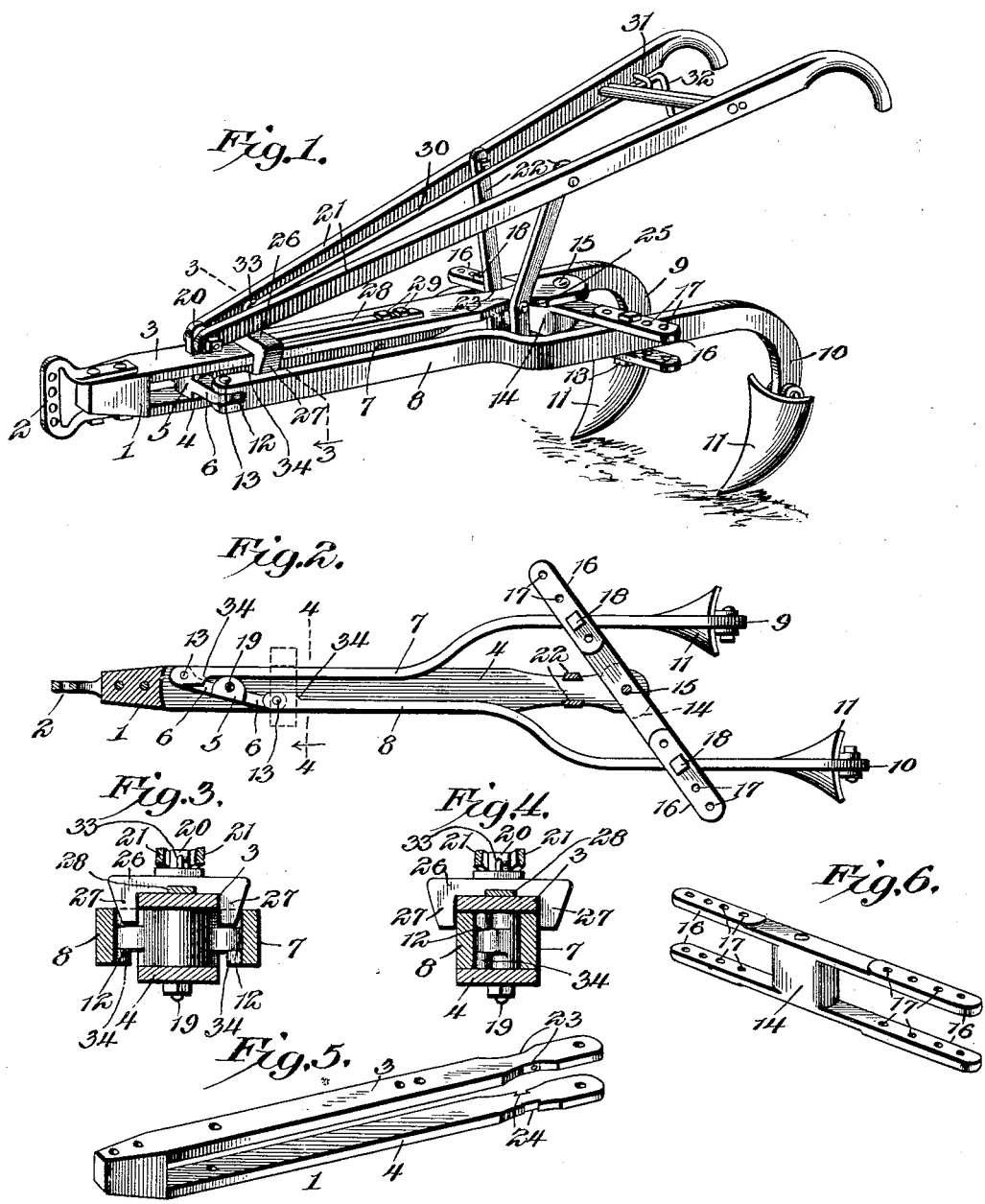

JAMES D. RIDDLE, OF CHATHAM, VIRGINIA.

CULTIVATOR.

SPECIFICATION forming part of Letters Patent No. 704,376, dated July 8, 1902.

Application filed March 6, 1902. Serial No. 96,969. (No model.)

*To all whom it may concern:*

Be it known that I, JAMES D. RIDDLE, a citizen of the United States, residing at Chatham, in the county of Pittsylvania and State of Virginia, have invented a new and useful Cultivator, of which the following is a specification.

This invention relates to cultivators, and has for its object to provide improved means whereby the shovels may be alternately adjusted one in front of the other and arranged for shifting the shovels from one position to another when turning at the end of a furrow, and thereby to obviate manual shifting of the shovels.

It is furthermore designed to provide for effectually locking the shovels in any of their adjusted positions and also to facilitate the unlocking thereof by the operator while standing at the handles of the cultivator in order that the shovels may be shifted by the turning movement of the cultivator when reversing the same at the end of a furrow.

Another object is to arrange the shovel-beams so as to lie within the cutivator-beam in certain of their adjusted positions, and thereby to provide a compact, strong, and durable implement.

Another object is to maintain the shovel-beams at a predetermined distance apart and to provide for conveniently adjusting the degree of separation of said beams, so as to accommodate the implement to the work in hand.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a cultivator constructed and arranged in accordance with the present invention and showing the shovels alined transversely of the implement. Fig. 2 is a plan section thereof with the shovels adjusted one in front of the other. Fig. 3 is a cross-sectional view on the line 3 3 of Fig. 1. Fig. 4 is a similar view on the line 4 4 of Fig. 2. Fig. 5 is a detail perspective view of the main cultivator-beam. Fig. 6 is a detail perspective view of the rear cross-head.

Like characters of reference designate corresponding parts in all the figures of the drawings.

In carrying out the present invention there is provided a main cultivator-beam 1, the forward end of which is provided with a clevis 2 or other suitable draft connection and the greater portion of the beam being provided with a longitudinal bifurcation which opens through the rear end thereof, so as to divide the beam into top and bottom members 3 and 4, respectively. Within the forward end of the bifurcation there is mounted a swinging cross-head 5, which consists of an intermediate enlarged portion having a working fit between the top and bottom members of the main beam and opposite reduced arms 6. At opposite sides of the main beam are the respective shovel-beams 7 and 8, which are bowed outwardly at corresponding intermediate portions, so that their rear ends may be separated by a greater interspace than their forward ends. The rear ends of the shovel-beams are extended downwardly to form the respective standards 9 and 10, to the lower ends of which are applied any ordinary form of cultivator-shovels 11. The forward end of each cultivator-beam is forked or bifurcated, as indicated at 12, the outer end of the adjacent arm 6 of the cross-head 5 being loosely received within the bifurcation and connected to the shovel-beam by means of a suitable pivot-pin 13. The rear end portions of the shovel-beams are connected and maintained at a predetermined interval by means of a rear cross-head comprising a central body portion 14, which has a working fit between the rear ends of the top and bottom members of the main beam, to which it is connected by means of a suitable pivot-pin 15. Upper and lower arms 16 project in opposite directions from the body 14, so as to produce a bifurcated cross-head, and the upper and lower arms are provided with a plurality of corresponding perforations 17. Each shovel-beam is loosely received within the bifurcation at the adjacent end of the cross-head or, in other words, between the top and bottom arms, and a bolt or other suitable fastening 18 is inserted through corresponding perforations in the arms and a vertical perforation in the shovel-beam, whereby the latter is pivotally connected to the rear cross-head. It will be understood that the fastenings 18 are removable, in order that the shovel-beams may be adjusted toward and away from one another by engaging the fastenings 18 with any of the perforations of the cross-head. It is preferable to have adjustable connections between the beams and the cross-head rather than to extend the latter, as the former arrangement obviates removal of the pivot-pin 15 when adjusting the beams toward or away from each other.

The front cross-head 5 is considerably shorter than the rear cross-head and is connected to the main beam by means of a headed pivot-pin 19, the head 20 of which is projected above the top of the main beam, and to the opposite sides of the head of the pin are connected the handle members 21, which incline upwardly and rearwardly and extend in rear of the shovel-beams. At an intermediate point each handle member is braced and supported by a standard 22, which is held into corresponding notches 23 and 24 in the adjacent edges of the top and bottom members of the main beam and connected to the same by means of suitable fastenings, one of which has been shown at 25 in Fig. 1 of the drawings.

From the foregoing description it is apparent that the shovel-beams are pivotally connected by cross-bars, which are in turn intermediately pivoted upon the main beam, so that by swinging the cross-heads in corresponding directions one beam or the other will be thrown in advance of the other, and thereby one shovel will be located in advance of the other, and by swinging the cross-heads to their opposite limits the disposition of the beams and the shovels will be reversed. It will here be observed that the width of each shovel-beam corresponds substantially to the width of the space between the top and bottom members of the cultivator-beam, and when adjusted, as indicated in Figs. 2 and 4, with one shovel in advance of the other, the forward portions of the shovel-beams will lie within the bifurcation of the main beam, whereby the shovel-beams will be housed and braced and the entire implement rendered strong and durable.

To lock the shovel-beams in the position indicated in Figs. 2 and 4, there has been provided an inverted substantially U-shaped locking-clip 26, which straddles the main beam immediately beneath the lower front end portions of the handles, with its pendent ends 27 embracing the outer sides of the shovel-beams, whereby the latter are held against separation and the cross-heads are held against pivotal movements. The clamp or lock is normally held in a depressed position by means of a leaf-spring 28, which has its rear end connected to the top of the main beam by means of suitable fastenings 27, while its forward free end is connected to the lock or clamp. It will of course be understood that there is sufficient space above the clip to permit of the same being elevated so that the opposite end portions or jaws 27 may clear the tops of the shovel-beams when it is desired to shift the latter. To facilitate the elevation of the clip, there is provided an endwise-movable rod 30, which has its rear end passed loosely through a guide 31, preferably a staple straddling the rod and driven into the inner side of one of the handles, the rear free end of the rod being formed into a handle 32, while the front end of the rod is connected to the center of the top of the clip, as indicated at 33, so that by pulling rearwardly upon the rod 30 the clip will be elevated against the tension of the spring, and when the rod is released the spring will return the clip to its normal position. When it is desired to have the shovels alined transversely of the implement, as indicated in Figs. 1 and 3, the jaws 27 lie between the shovel-beams and the respective sides of the main beam, the outer sides of the jaws being beveled inwardly and downwardly to form wedges, which lie snugly between the main beam and the shovel-beams, and thereby hold the latter in substantially parallel relation, with the cross-heads disposed transversely of the main beam. Moreover, the forward end of each shovel-beam is enlarged and projected at its inner side so as to form a shoulder 34, which lies in engagement with the front side of the adjacent jaw or wedge 27 and forms an additional means to prevent looseness of the shovel-beams. When turning the cultivator at either end of a furrow, the rod 30 is pulled so as to elevate the locking-clip, and thereby free the shovel-beams, so that as the cultivator is being turned the shovel which was originally in advance will drag upon the ground, and thereby swing the cross-heads to their opposite limits, and thus automatically shift the beams to their opposite positions, after which the controlling-rod is released, and the clip is returned to its original position by the spring, and the shovel-beams are again locked.

From the foregoing description it is apparent that the means for locking the shovel-beams is under the convenient control of the operator, so that the said beams may be shifted whenever desired without requiring the removal of complicated fastening devices, and besides locking the beams advanced one in front of the other they may be locked when assuming corresponding positions at opposite sides of the main beam to locate the shovels in transverse alinement. Moreover, the parts of the implement are compactly arranged, so as to mutually brace and stiffen each other, and thereby render the device strong and durable, and all parts are conveniently accessible for repairs.

An important advantage of the present invention resides in the fact that the forward ends of the shovel-beams always lie mutually in close proximity, even when the shovels are alined transversely of the implement, by reason of the provision of the comparatively short cross-head 5 at the forward ends of the shovel-beams. This relation of parts is important, as the width of the implement is materially decreased at its forward end, whereby the implement is more readily handled and takes up considerably less room.

What I claim is—

1. The combination with a main beam, of shovel-beams lying at opposite sides thereof and having their forward ends pivotally connected thereto, a cross-head pivoted intermediately to the main beam and having its opposite ends longitudinally bifurcated, the top and bottom members of the cross-head being provided with corresponding perforations, the shovel-beams being received within the respective bifurcations of the cross-head, and pivots for engagement with the perforations to adjustably connect the shovel-beams to the cross-head.

2. The combination with a main beam having a substantially horizontal longitudinal slot, of a shovel-beam pivoted to the main beam to swing in the substantially horizontal plane of the slot and capable of being swung into and out of the slot.

3. The combination with a main beam having a substantially horizontal longitudinal slot, of shovel-beams lying at opposite sides of the main beam with their forward ends pivoted within the slot to swing in the substantially horizontal plane of said slot, the depth of the latter being at least equal to the thickness of each shovel-beam, and the latter being adapted to lie within the slot at one and the same time.

4. The combination with a longitudinally-slotted main beam, of shovel-beams lying at opposite sides of the main beam and capable of being adjusted into the slot of the main beam.

5. The combination with a longitudinally-slotted main beam, of shovel-beams lying at opposite sides thereof and having their forward ends pivotally connected within the slot and also capable of being swung into the slotted portion of the main beam.

6. The combination with a longitudinally-slotted main beam, of shovel-beams lying at opposite sides thereof, and a cross-head intermediately pivoted to the main beam and having its opposite ends pivotally connected to the shovel-beams, whereby the latter may be swung into the slotted portion of the main beam.

7. The combination with a longitudinally-slotted main beam, of shovel-beams lying at opposite sides thereof, and a cross-head intermediately pivoted within the slot of the main beam and having its opposite ends pivotally connected to the shovel-beams, the cross-head being freely movable within the main beam and capable of being reversed, whereby the shovel-beams may be alternately shifted one in front of the other and also swung inwardly into the slotted portion of the main beam.

8. The combination with a longitudinally-slotted main beam, of shovel-beams located at opposite sides of the main beam and pivotally connected within the slotted portion thereof and capable of adjustment into and out of said slotted portion, and means for locking the shovel-beams within the slotted portion of the main beam and also when lying externally at opposite sides thereof.

9. The combination with a longitudinally-slotted main beam having a pair of handles extended rearwardly therefrom, of shovel-beams located at opposite sides of the main beam, pivotally connected within the slotted portion thereof and capable of being swung into and out of said slotted portion, means for locking the shovel-beams within the slotted portion of the main beam and also when disposed externally thereof, and means in reach of an operator when standing at the rear end of the handles for controlling the locking means.

10. The combination with a longitudinally-slotted main beam, of shovel-beams located at opposite sides thereof and pivotally connected within the slotted portion of the beam and also capable of being swung into said slotted portion, and locking means which is capable of embracing the shovel-beams when disposed within the main beam, and also capable of being inserted between the shovel-beams and the main beam to lock the former beams when adjusted externally of the main beam.

11. The combination with a longitudinally-slotted main beam, of shovel-beams located at opposite sides and pivotally connected within the slotted portion thereof and also capable of being swung into said slotted portion, and an inverted substantially U-shaped locking-clip mounted upon the main beam, and constructed to have its opposite end portions embrace the shovel-beams when swung into the slotted portion of the main beam, and also to be inserted between the shovel-beams and the main beam when the former beams are swung outwardly from the main beam.

12. The combination with a longitudinally-slotted main beam, of shovel-beams lying at opposite sides and having their forward ends pivotally connected within the slotted portion thereof and also capable of being swung into said slotted portion, and a spring-actuated inverted substantially U-shaped locking-clip mounted upon the main beam in rear of the pivotal connection of the shovel-beams, the opposite end portions of the clip being constructed to embrace the shovel-beams when swung into the main beam, and also to be inserted between the shovel-beams and the main beam when the former beams are swung outwardly from the main beam.

13. The combination with a longitudinally-slotted main beam, of shovel-beams lying at opposite sides and having their forward ends pivotally connected within the slotted portion thereof and also capable of being swung into said slotted portion, an inverted substantially U-shaped locking-clip mounted upon the main beam in rear of the pivotal connection of the shovel-beams, the opposite end portions of the clip being constructed to embrace the shovel-beams when swung into the main beam, and also to be inserted between the shovel-beams and the main beam when the former beams are swung outwardly from the main beam, and a spring having one end connected to the main beam and its free end connected to the clip to normally hold the latter depressed.

14. The combination with a longitudinally-slotted main beam, of shovel-beams located at opposite sides and having their forward ends pivotally connected within the slotted portion of the main beam, whereby the shovel-beams are capable of being swung into and out of the slotted portion of the main beam, the rear ends of the shovel-beams being offset laterally outward so as to be separated by an interspace when the forward portions are swung into the slotted portions of the main beam.

15. The combination with a longitudinally-slotted main beam, of shovel-beams located at opposite sides and pivotally connected within the slotted portion of the main beam and capable of adjustment into and out of said slotted portion, and means for locking the shovel-beams within the slotted portion of the main beam.

16. The combination with a longitudinally-slotted main beam, having a pair of handles extending rearwardly therefrom, shovel-beams located at opposite sides of the main beam, pivotally connected within the slotted portion thereof and capable of being swung into and out of said slotted portion, means for locking the shovel-beams within the slotted portion of the main beam, and means in reach of an operator when standing at the rear end of the handles for controlling the locking means.

17. The combination with a longitudinally-slotted main beam, of opposite shovel-beams to lie within the slotted portion of the main beam and capable of being alternately shifted one in advance of the other, and means for locking the shovel-beams within the main beam.

18. The combination with a longitudinally-slotted main beam, of a cross-head intermediately pivoted within the slotted portion thereof, shovel-beams pivoted to the respective ends of the cross-head and capable of being swung into the slotted portion of the main beam alternately one in advance of the other, the rear end portions of the shovel-beams being offset laterally, and means for locking the shovel-beams when shifted one in advance of the other.

19. The combination with a longitudinally-slotted main beam, of front and rear cross-heads intermediately pivoted within the slotted portion of the main beam, shovel-beams located at opposite sides of the main beam, pivotally connected to corresponding ends of the front and rear cross-heads, and also capable of being swung into the slotted portion of the main beam and alternately shifted one in advance of the other, and means for locking the shovel-beams when located within the slot of the beam and also when located exteriorly of the beam.

20. The combination with a longitudinally-slotted main beam, of a front cross-head pivoted intermediately within the main beam and having opposite reduced arms, a rear cross-head pivoted intermediately within the main beam and having longitudinally-bifurcated ends, shovel-beams located at opposite sides of the main beam with their rear ends received within the bifurcated portions of the rear cross-head and pivotally connected thereto, the front ends of the shovel-beams being bifurcated to receive the respective ends of the cross-head, pivotal connections between the front ends of the shovel-beams and the front cross-head, and means for locking the shovel-beams in differently-adjusted positions.

21. The combination with a longitudinally-bifurcated main beam, of a front cross-head intermediately pivoted within the main beam and having opposite reduced arms, a rear cross-head intermediately pivoted within the beam and having bifurcated ends, the opposite sides of the bifurcated portions being provided with a plurality of corresponding perforations, shovel-beams located at opposite sides of the main beam and capable of being received within the slotted portion thereof, the forward ends of the shovel-beams being bifurcated and pivotally embracing the respective ends of the front cross-head, the rear end portions of the shovel-beams being offset laterally, received within the bifurcated portions of the rear cross-head and provided at their rear ends with standards, detachable fastenings piercing the shovel-beams and corresponding perforations of the rear cross-head, cultivator-shovels carried by the standards, a pair of handles inclined upwardly and rearwardly from the top of the main beam, braces rising from opposite sides of the main beam and connected to the handles, a vertically-movable inverted substantially U-shaped clip embracing the main beam in rear of the front cross-head with its opposite pendent end portions capable of embracing the shovel-beams when lying within the main beam and also of being inserted between the main beam and the shovel-beams to lock the latter when adjusted away from the main beam, a spring to maintain the clip at its lowermost position, and a controlling-rod connected to the clip and extended to the rear ends of the handles for convenience in manipulation.

In testimony that I claim the foregoing as my own I have hereto affixed my signature in the presence of two witnesses.

JAMES D. RIDDLE.

Witnesses:
C. W. MOTLEY,
O. S. B. YEATTS.